United States Patent [19]
Akasaka

[11] Patent Number: 5,756,976
[45] Date of Patent: May 26, 1998

[54] MICROWAVABLE TORTILLA BOWL MAKING DEVICE

[76] Inventor: Kimberly Akasaka, 44 Mancera, Rancho Santa Margarita, Calif. 92688

[21] Appl. No.: 732,699

[22] Filed: Oct. 18, 1996

[51] Int. Cl.$^6$ .................................... H05B 6/80
[52] U.S. Cl. ................ 219/732; 219/735; 219/762; 99/DIG. 14
[58] Field of Search .................. 219/725, 729, 219/730, 732, 733, 734, 735, 762; 99/DIG. 14; 426/107, 234, 243, 241

[56] References Cited

U.S. PATENT DOCUMENTS

| | | | |
|---|---|---|---|
| 4,494,453 | 1/1985 | Bentson | 99/353 |
| 5,072,664 | 12/1991 | Tienor et al. | 99/353 |
| 5,236,727 | 8/1993 | Huston | 426/138 |
| 5,315,083 | 5/1994 | Green | 219/734 |
| 5,370,042 | 12/1994 | Tolchin et al. | 99/DIG. 14 |
| 5,389,768 | 2/1995 | Sarnoff et al. | 219/732 |

*Primary Examiner*—Philip H. Leung

[57] ABSTRACT

A microwavable tortilla bowl making device including an exterior rounded bowl portion having a plurality of vertically disposed slots therethrough in a spaced relationship. The exterior rounded bowl portion receives a flat tortilla therein. An interior rounded bowl portion is dimensioned for positioning within the exterior rounded bowl portion. The interior rounded bowl portion has a plurality of vertically disposed slots therethrough in a spaced relationship. The interior rounded bowl portion is positioned over the flat tortilla within the exterior rounded bowl portion whereby the flat tortilla conforms into a bowl-shape.

1 Claim, 2 Drawing Sheets

MICROWAVABLE TORTILLA BOWL MAKING DEVICE

BACKGROUND OF THE INVENTION

1. Field of the Invention

The present invention relates to a microwavable tortilla bowl making device and more particularly pertains to shaping a flat tortilla into a serving bowl with a microwavable tortilla bowl making device.

2. Description of the Prior Art

The use of tortilla makers is known in the prior art. More specifically, tortilla makers heretofore devised and utilized for the purpose of making and warming tortillas are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,400,704 to Huston discloses a tortilla cooking apparatus method.

U.S. Pat. No. 5,072,664 to Tienor et al. discloses a shell maker apparatus.

U.S. Pat. No. 310,946 to White discloses the ornamental design for a tortilla warmer.

U.S. Pat. No. 281,942 to Bentson discloses the ornamental design for a hinged tortilla basket fryer.

U.S. Pat. No. 4,664,025 to Martinez discloses a tortilla maker.

U.S. Pat. No. 4,173,926 to Brignall discloses a tortilla pie shell holder.

While these devices fulfill their respective, particular objective and requirements, the aforementioned patents do not describe a microwavable tortilla bowl making device for shaping a flat tortilla into a serving bowl.

In this respect, the microwavable tortilla bowl making device according to the present invention substantially departs from the conventional concepts and designs of the prior art, and in doing so provides an apparatus primarily developed for the purpose of shaping a flat tortilla into a serving bowl.

Therefore, it can be appreciated that there exists a continuing need for new and improved microwavable tortilla bowl making device which can be used for shaping a flat tortilla into a serving bowl. In this regard, the present invention substantially fulfills this need.

SUMMARY OF THE INVENTION

In the view of the foregoing disadvantages inherent in the known types of tortilla makers now present in the prior art, the present invention provides an improved microwavable tortilla bowl making device. As such, the general purpose of the present invention, which will be described subsequently in greater detail, is to provide a new and improved microwavable tortilla bowl making device and method which has all the advantages of the prior art and none of the disadvantages.

To attain this, the present invention essentially comprises an exterior rounded bowl portion having an open top end, a closed bottom end and a cylindrical side wall therebetween. The open top end is defined by an upper peripheral rim. The upper peripheral rim has a pair of diametrically opposed handles extending outwardly therefrom. The closed bottom end has a plurality of feet extending outwardly therefrom. The cylindrical side wall has a plurality of vertically disposed slots therethrough in a spaced relationship. The exterior rounded bowl portion receives a flat tortilla therein. The device includes an interior rounded bowl portion having an open top end, a closed bottom end and a cylindrical side wall therebetween. The interior rounded bowl portion is dimensioned for positioning within the exterior rounded bowl portion. The open top end is defined by an upper peripheral rim. A cross bar extends diametrically across the upper peripheral rim. The cross bar has an inverted U-shaped handle extending upwardly from a central portion thereof. The cylindrical side wall has a plurality of vertically disposed slots therethrough in a spaced relationship. The interior rounded bowl portion is positioned over the flat tortilla within the exterior rounded bowl portion whereby the flat tortilla conforms into a bowl-shape.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved microwavable tortilla bowl making device which has all the advantages of the prior art tortilla makers and none of the disadvantages.

It is another object of the present invention to provide a new and improved microwavable tortilla bowl making device which may be easily and efficiently manufactured and marketed.

It is a further object of the present invention to provide a new and improved microwavable tortilla bowl making device which is of durable and reliable construction.

An even further object of the present invention is to provide a new and improved microwavable tortilla bowl making device which is susceptible of a low cost of manufacture with regard to both materials and labor, and which accordingly is then susceptible of low prices of sale to the consuming public, thereby making such a microwavable tortilla bowl making device economically available to the buying public.

Even still another object of the present invention is to provide a new and improved microwavable tortilla bowl making device for shaping a flat tortilla into a serving bowl.

Lastly, it is an object of the present invention to provide a new and improved microwavable tortilla bowl making device including an exterior rounded bowl portion having a plurality of vertically disposed slots therethrough in a spaced relationship. The exterior rounded bowl portion receives a flat tortilla therein. An interior rounded bowl portion is dimensioned for positioning within the exterior rounded bowl portion. The interior rounded bowl portion has a plurality of vertically disposed slots therethrough in a spaced relationship. The interior rounded bowl portion is positioned over the flat tortilla within the exterior rounded bowl portion whereby the flat tortilla conforms into a bowl-shape.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
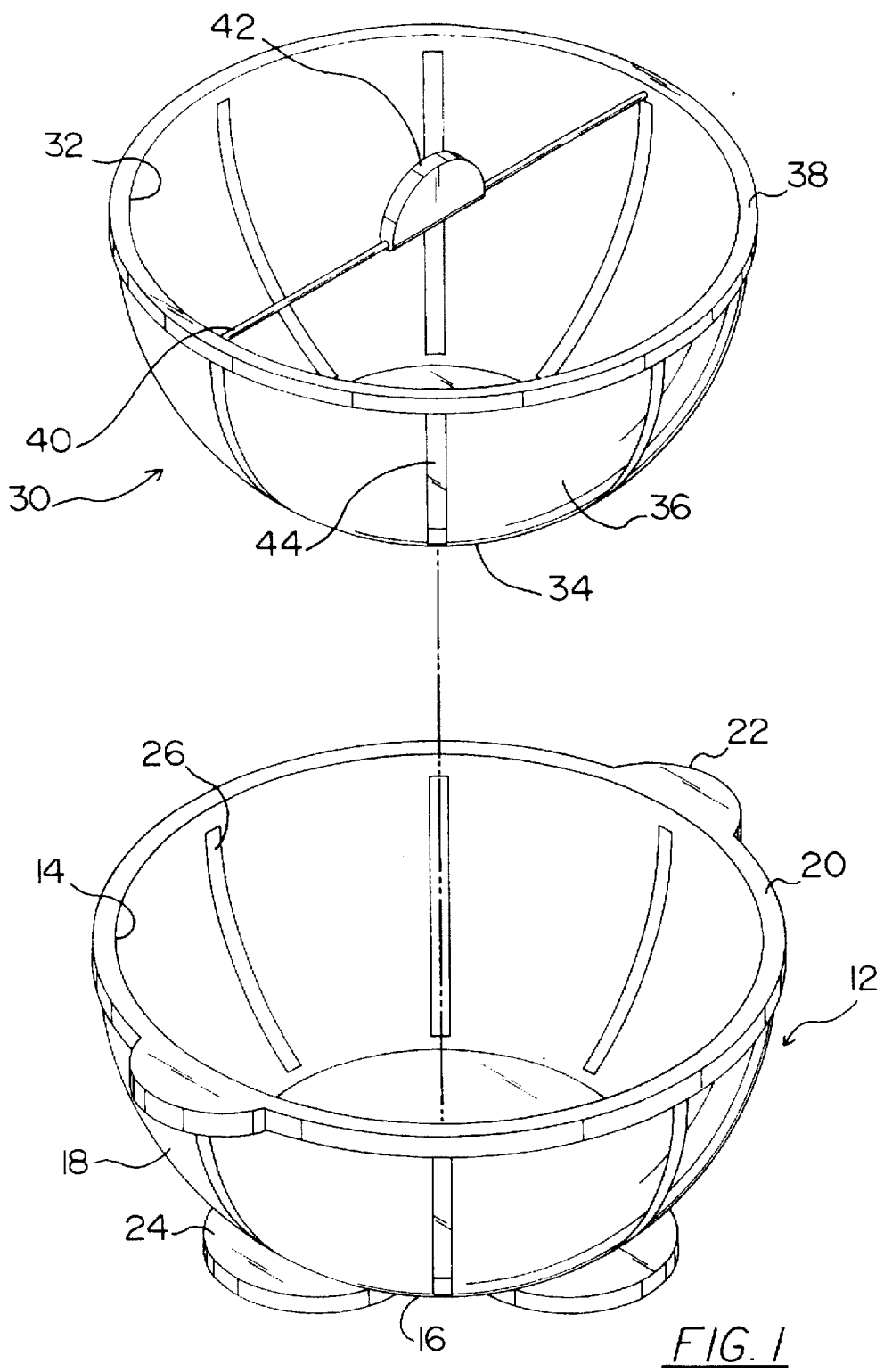
FIG. 1 is a perspective view of the preferred embodiment of the microwavable tortilla bowl making device constructed in accordance with the principles of the present invention.
Figure 2:
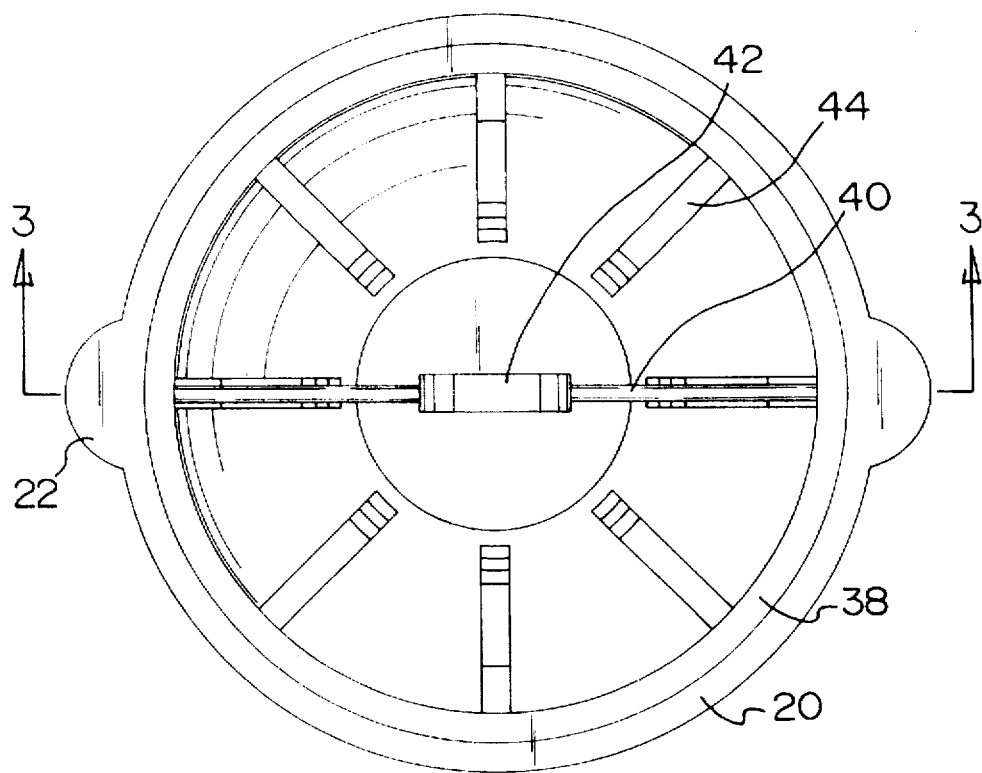
FIG. 2 is a top plan view of the preferred embodiment of the present invention.
Figure 3:
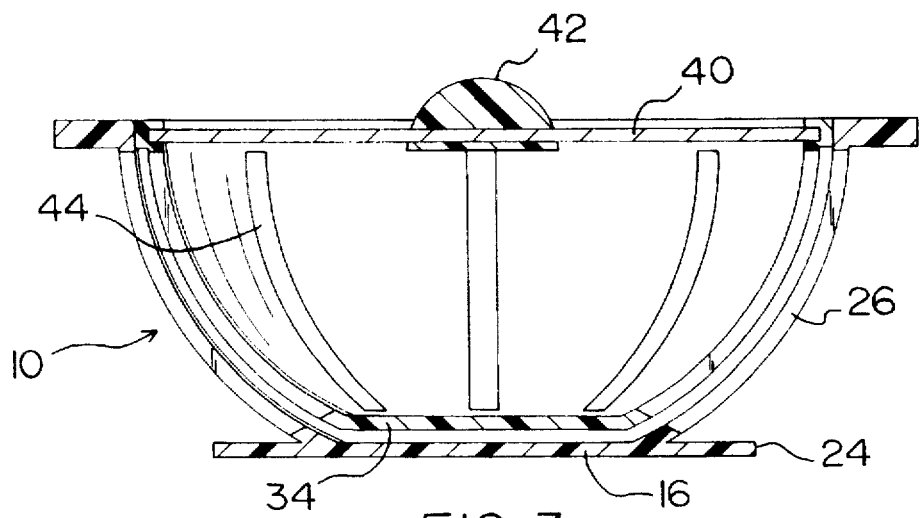
FIG. 3 is a cross-sectional view of the present invention as taken along line 3—3 of FIG. 2.

With reference now to the drawings, and in particular, to FIGS. 1 through 3 thereof, the preferred embodiment of the new and improved microwavable tortilla bowl making device embodying the principles and concepts of the present invention and generally designated by the reference number 10 will be described.

Specifically, it will be noted in the various Figures that the device relates to a microwavable tortilla bowl making device for shaping a flat tortilla into a serving bowl. In its broadest context, the device consists of an exterior rounded bowl portion and an interior rounded bowl portion. Such components are individually configured and correlated with respect to each other so as to attain the desired objective.

The device 10 includes an exterior rounded bowl portion 12 having an open top end 14, a closed bottom end 16 and a cylindrical side wall 18 therebetween. The open top end 14 is defined by an upper peripheral rim 20. The upper peripheral rim 20 has a pair of diametrically opposed handles 22 extending outwardly therefrom. The handles 22 allow for a user to easily handle the device 10. The closed bottom end 16 has a plurality of feet 24 extending outwardly therefrom. The plurality of feet 24 provide balance to the device 10. The cylindrical side wall 18 has a plurality of vertically disposed slots 26 therethrough in a spaced relationship. The exterior rounded bowl portion 12 receives a flat tortilla therein. The size of the exterior rounded bowl portion 12 can be varied to accommodate the desired size of the bowl to be made.

The device 10 also includes an interior rounded bowl portion 30 having an open top end 32, a closed bottom end 34 and a cylindrical side wall 36 therebetween. The interior rounded bowl portion 30 is dimensioned for positioning within the exterior rounded bowl portion 12. The open top end 32 is defined by an upper peripheral rim 38. A cross bar 40 extends diametrically across the upper peripheral rim 38. The cross bar 40 has an inverted U-shaped handle 42 extending upwardly from a central portion thereof. The cylindrical side wall 36 has a plurality of vertically disposed slots 44 therethrough in a spaced relationship. The interior rounded bowl portion 30 is positioned over the flat tortilla within the exterior rounded bowl portion 12 whereby the flat tortilla conforms into a bowl-shape.

In use the tortilla is placed in between the interior and exterior rounded bowl portions 12,30 and then placed into a microwave for a predetermined amount of time, based upon the power of the microwave. After a short time, the tortilla is formed into the shape of a bowl. The device 10 is preferably constructed on a microwave-safe plastic material for ease in handling. The slots 26,44 provide ventilation to the device 10 so as to allow air to circulate around the tortilla while cooking.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A microwavable tortilla bowl making device for shaping a flat tortilla into a serving bowl comprising, in combination:

an exterior rounded bowl portion having an open top end, a closed bottom end and a cylindrical side wall therebetween, the open top end being defined by an upper peripheral rim, the upper peripheral rim having a pair of diametrically opposed handles extending outwardly therefrom, the closed bottom end having a plurality of feet extending outwardly therefrom to maintain the exterior rounded bowl portion in an upright orientation on a recipient surface, the cylindrical side wall having a plurality of vertically disposed slots therethrough in a spaced relationship, the exterior rounded bowl portion receiving a flat tortilla therein; and an interior rounded bowl portion having an open top end, a closed bottom end and a cylindrical side wall therebetween, the interior rounded bowl portion being dimensioned for positioning within the exterior rounded bowl portion, the open top end being defined by an upper peripheral rim, a cross bar extending diametrically across the upper peripheral rim, the cross bar having an inverted U-shaped handle extending upwardly from a central portion thereof, the cylindrical side wall having a plurality of vertically disposed slots therethrough in a spaced relationship, the interior rounded bowl portion positioned over the flat tortilla within the exterior rounded bowl portion whereby the flat tortilla conforming into a bowl-shape.

* * * * *